(12) United States Patent
Koshiba

(10) Patent No.: US 8,908,064 B2
(45) Date of Patent: Dec. 9, 2014

(54) IMAGING APPARATUS AND IMAGING METHOD

(71) Applicant: FUJIFILM Corporation, Minato-ku, Tokyo (JP)

(72) Inventor: Masaaki Koshiba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/850,589

(22) Filed: Mar. 26, 2013

(65) Prior Publication Data

US 2013/0208147 A1 Aug. 15, 2013

Related U.S. Application Data

(63) Continuation of application No. PCT/JP2011/061560, filed on May 19, 2011.

(30) Foreign Application Priority Data

Sep. 27, 2010 (JP) ................................. 2010-216107

(51) Int. Cl.

| H04N 5/262 | (2006.01) |
|---|---|
| H04N 5/235 | (2006.01) |
| H04N 5/355 | (2011.01) |
| G03B 7/093 | (2006.01) |

(52) U.S. Cl.
CPC ......... *H04N 5/2353* (2013.01); *H04N 5/35554* (2013.01); *G03B 7/093* (2013.01); *H04N 5/35563* (2013.01); *H04N 5/35545* (2013.01)
USPC ...................................... 348/239; 348/221.1

(58) Field of Classification Search
CPC ... H04N 5/272; H04N 2101/00; H04N 5/772; H04N 5/23293; H04N 5/262

USPC ....................................... 348/339, 239, 22.11
See application file for complete search history.

(56) References Cited

U.S. PATENT DOCUMENTS

| 7,586,853 | B2 * | 9/2009 | Bonsma et al. ................ 370/254 |
| 8,508,611 | B2 * | 8/2013 | Kasai et al. ................ 348/222.1 |
| 8,542,315 | B2 * | 9/2013 | Sorek et al. .................... 348/364 |

(Continued)

FOREIGN PATENT DOCUMENTS

| JP | 2004-048445 A | 2/2004 |
| JP | 2004-120205 A | 4/2004 |

(Continued)

OTHER PUBLICATIONS

Written Opinion of the International Searching Authority for PCT/JP2011/061560 filed May 19, 2011.
Office Action dated Jul. 30, 2014, issued by the State Intellectual Property Office of the People's Republic of China in counterpart Chinese Application No. 201180046563.9.

*Primary Examiner* — Twyler Haskins
*Assistant Examiner* — Fayez Bhuiyan
(74) *Attorney, Agent, or Firm* — Sughrue Mion, PLLC

(57) ABSTRACT

An imaging apparatus includes: a device control unit that performs a driving in which a first captured image signal during a first exposure period and a second captured image signal during each of second exposure periods are read by sequentially exposing second photoelectric conversion elements for the second exposure periods while exposing first photoelectric conversion elements for the first exposure period, and an image processing unit that performs a processing in which a captured image signal with a dynamic range is generated by using the first captured image signal and at least one of the second captured image signals, and the processing includes plural types of processings where numbers of the second captured image signals to be used are different.

18 Claims, 12 Drawing Sheets

(56) References Cited

U.S. PATENT DOCUMENTS

| | | | |
|---|---|---|---|
| 8,670,043 B2 * | 3/2014 | Shinmei et al. | 348/228.1 |
| 2006/0033823 A1 | 2/2006 | Okamura | |
| 2008/0173794 A1 | 7/2008 | Okie et al. | |
| 2009/0244350 A1 | 10/2009 | Wada | |
| 2010/0053346 A1 | 3/2010 | Mitsunaga | |

FOREIGN PATENT DOCUMENTS

| | | |
|---|---|---|
| JP | 2005-117276 A | 4/2005 |
| JP | 2007-214832 A | 8/2007 |
| JP | 2007-221423 A | 8/2007 |
| JP | 2009-302653 A | 12/2009 |
| JP | 2010-062785 A | 3/2010 |

* cited by examiner

FIG. 6

| CAPTURED IMAGE DATA HAVING DR OF 100% | | | | | DATA IN MEMORY | | | |
|---|---|---|---|---|---|---|---|---|
| SATURA-TION | SATURA-TION | SATURA-TION | SATURA-TION | | | | | |
| SATURA-TION | NON-SAT-URATION | NON-SAT-URATION | SATURA-TION | | | DR100% | DR100% | |
| SATURA-TION | NON-SAT-URATION | NON-SAT-URATION | SATURA-TION | | | DR100% | DR100% | |
| SATURA-TION | SATURA-TION | SATURA-TION | SATURA-TION | | | | | |

FIG. 7

| CAPTURED IMAGE DATA HAVING DR OF 133% | | | | | DATA IN MEMORY | | | |
|---|---|---|---|---|---|---|---|---|
| SATURA-TION | SATURA-TION | SATURA-TION | SATURA-TION | | | DR133% | DR133% | |
| SATURA-TION | NON-SAT-URATION | NON-SAT-URATION | SATURA-TION | | | DR100% | DR100% | |
| SATURA-TION | NON-SAT-URATION | NON-SAT-URATION | SATURA-TION | | | DR100% | DR100% | |
| SATURA-TION | SATURA-TION | SATURA-TION | SATURA-TION | | | DR133% | DR133% | |

FIG. 8

| | CAPTURED IMAGE DATA HAVING DR OF 400% | | |
|---|---|---|---|
| SATURA-TION | SATURA-TION | NON-SAT-URATION | NON-SAT-URATION |
| NON-SAT-URATION | NON-SAT-URATION | NON-SAT-URATION | NON-SAT-URATION |
| NON-SAT-URATION | NON-SAT-URATION | NON-SAT-URATION | NON-SAT-URATION |
| NON-SAT-URATION | NON-SAT-URATION | NON-SAT-URATION | NON-SAT-URATION |

| | DATA IN MEMORY | | |
|---|---|---|---|
| | | DR400% | DR400% |
| DR133% | DR100% | DR100% | DR133% |
| DR133% | DR100% | DR100% | DR133% |
| DR400% | DR400% | DR400% | DR400% |

FIG. 9

| RECORDED CAPTURED IMAGE DATA | | | |
|---|---|---|---|
| DR400% | DR400% | DR400% | DR400% |
| DR133% | DR100% | DR100% | DR133% |
| DR133% | DR100% | DR100% | DR133% |
| DR400% | DR400% | DR400% | DR400% |

IMAGING APPARATUS AND IMAGING METHOD

CROSS REFERENCE TO RELATED APPLICATION

This is a continuation of International Application No. PCT/JP2011/061560 filed on May 19, 2011, and claims priority from Japanese Patent Application No. 2010-216107, filed on Sep. 27, 2010, the entire disclosures of which are incorporated herein by reference.

TECHNICAL FIELD

The present invention relates to an imaging apparatus and an imaging method.

BACKGROUND ART

CCD (Charge Coupled Device) type solid state imaging devices or MOS (Metal Oxide Semiconductor) type solid state imaging devices are distributed as solid state imaging devices for imaging a subject. A dynamic range of the solid state imaging devices for an incident light is being gradually enhanced by the improvement of semiconductor technologies. However, it is not so uncommon that an incident light exceeding a preset dynamic range is generated in a situation where a solid state imaging device is actually utilized. Therefore, a technology for extending a dynamic range is being actively investigated.

For example, Patent Literature 1 discloses an imaging apparatus that includes a pixel that performs long-term exposure and a pixel that starts short-term exposure during a period where the long-term exposure is being performed, and combines an image obtained with the long-term exposure and an image obtained with the short-term exposure to extend a dynamic range.

Further, Patent Literature 2 discloses an imaging apparatus provided with a solid state imaging device in which pixels that perform long-term exposure and pixels that perform short-term exposure multiple times and conduct outputting each time the short-term exposure is performed. The pixels are arranged in a grid pattern. The imaging apparatus averages a plurality of images obtained with the short-term exposure to correct camera shake and combines an image after averaging and an image obtained with the long-term exposure to extend a dynamic range.

Patent Literature 3 discloses a technique in which exposures are performed multiple times with a pixel that performs short-term exposure during exposure in a pixel that performs long-term exposure using a solid state imaging device provided with the pixel that performs long-term exposure and the pixel that perform short-term exposure to aim to extend the dynamic range.

CITATION LIST

Patent Literature

Patent Literature 1 JP-A-2009-302653
Patent Literature 2 JP-A-2010-62785
Patent Literature 3 JP-A-2007-214832

SUMMARY OF INVENTION

Technical Problem

It is necessary for any of the imaging apparatuses to perform photographing several times while changing a ratio of the long-term exposure and the short-term exposure in order to obtain plural kinds of image data having different dynamic ranges for the same subject. However, a photographing environment changes every moment. For example, the subject may move or the sun may disappear behind the clouds between photographings. Therefore, it is not easy to obtain image data having different dynamic ranges for the same subject.

If a dynamic range can be determined after the photographing (obtaining of the captured image signal) is ended, it becomes possible to obtain an expected image, but, until now, an imaging apparatus with such a function is not present.

The present invention has been made in an effort to solve the problems described above and intends to provide an imaging apparatus and an imaging method capable of determining a dynamic range after photographing.

Solution to Problem

An imaging apparatus of the present invention is provided with a solid state imaging device that includes a plurality of first photoelectric conversion elements and a plurality of second photoelectric conversion elements arranged in a two-dimensional array. The imaging apparatus includes: a driving unit that performs a driving in which a first captured image signal according to electrical charges accumulated in the plurality of first photoelectric conversion elements during the first exposure period and a second captured image signal according to electrical charges accumulated in the plurality of second photoelectric conversion elements during each of several second exposure periods are read by sequentially exposing the plurality of second photoelectric conversion elements for the several second exposure periods while simultaneously exposing the plurality of first photoelectric conversion elements for a first exposure period; and an image processing unit that performs a processing in which a captured image signal with a dynamic range is generated by using the first captured image signal and at least one of the plurality of the second captured image signals, and each of the second exposure periods overlaps with the first exposure period and the processing includes plural types of processings where numbers of the second captured image signals to be used are different.

With this configuration, it is possible to obtain at least three captured image signals (a first captured image signal and at least two second captured image signals) having different sensitivities in a single photographing. For instance, when the several second exposure periods correspond to two second exposure periods, the image processing unit selects and performs a processing that generates an image data having a first dynamic range by combining an image data generated from the first captured image signal with another image data generated from one of the two second captured image signals, and another processing that generate an image data having a second dynamic range by combining the image data generated from the first captured image signal with the other of the two second captured image signals so that a dynamic range can be determined after photographing, and as a result, the convenience of the imaging apparatus can be improved.

An imaging method of the present invention uses a solid state imaging device that includes a plurality of first photoelectric conversion elements and a plurality of second photoelectric conversion elements arranged in a two-dimensional array. The imaging method includes: a driving step of reading-out a first captured image signal according to electrical charges accumulated in the plurality of first photoelectric conversion elements during the first exposure period and a second signal according to electrical charges accumulated in each of the plurality of second photoelectric conversion elements during each of several second exposure periods are read by sequentially exposing the plurality of second photoelectric conversion elements for the several second exposure periods while simultaneously exposing, the plurality of first photoelectric conversion elements for a first exposure period; and an image processing step of performing a processing in which a captured image signal with a dynamic range is generated by using the first captured image signal and at least one of the plurality of the second captured image signals, and each of the second exposure periods overlaps with the first exposure period and the processing includes plural types of processings where numbers of the second captured image signals to be used are different.

Advantageous Effects of Invention

According to the present invention, it is possible to provide an imaging apparatus and an imaging method capable of determining a dynamic range after photographing.

BRIEF DESCRIPTION OF DRAWINGS

FIG. 6 is a view specifically illustrating step S14 in the flow chart illustrated in FIG. 5.

FIG. 7 is a view specifically illustrating step S18 in the flow chart illustrated in FIG. 5.

FIG. 8 is a view specifically illustrating step S21 in the flow chart illustrated in FIG. 5.

FIG. 9 is a view specifically illustrating step S22 in the flow chart illustrated in FIG. 5.

DESCRIPTION OF EMBODIMENTS

Hereinafter, an embodiment of the present invention will be described with reference to the accompanying drawings.

Figure 1:
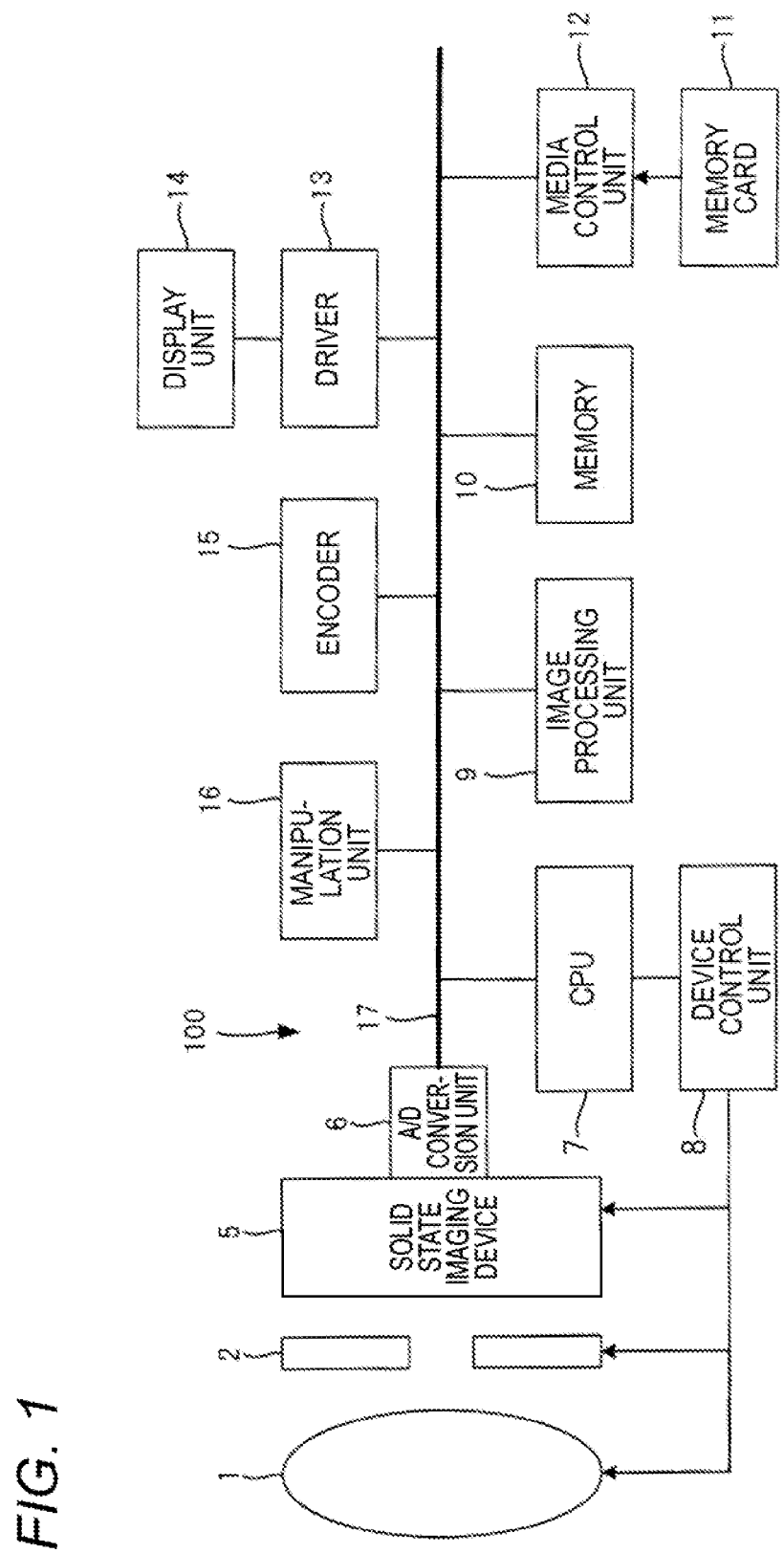
FIG. 1 is a functional block diagram of an imaging apparatus for describing an embodiment of the present invention.

FIG. 1 is a functional block diagram of an imaging apparatus 100 for describing an embodiment of the present invention. The imaging system of the imaging apparatus 100 includes a photographing lens system 1, a diaphragm 2, a solid state imaging device 5, and an analog-to-digital (A/D) conversion unit 6.

The diaphragm 2 is disposed at the rear side of the photographing lens system 1. A photographing optical system is constituted with the photographing lens system 1 and the diaphragm 2.

The solid state imaging device 5 which is a MOS type solid state imaging device is disposed in the rear side of the diaphragm 2, and details of which will be described later. A captured image signal, which corresponds to an optical image incident on the light receiving surface of the solid state imaging device 5 after passing through the photographing lens system 1 and the diaphragm 2 in this order, is converted into digital data in the A/D conversion unit 6, and then output onto a bus 17.

A central processing unit (CPU) 7 integrally controlling the entire imaging apparatus 100, a manipulation unit 16 constituted with, such as a manipulation button including a shutter release button, an image processing unit 9 constituted with, such as a DSP and performing image processing for the captured image signal based on an instruction from the CPU 7, a video encoder 15 converting captured image data obtained by performing image processing into data for display, a driver 13 displaying the captured image data converted in the video encoder 15 on a display unit 14, a memory 10, and a media control unit 12 are connected to the bus 17. A recording medium (memory card) (11) is detachably mounted on the media control unit 12.

A device control unit 8 is connected to the CPU 7. The device control unit 8 controls the driving of the solid state imaging device 5, an adjustment of an opening size of the diaphragm 2 and a focus position or a zoom position of the photographing lens system 1 according to an instruction from the CPU 7.

Figure 2:
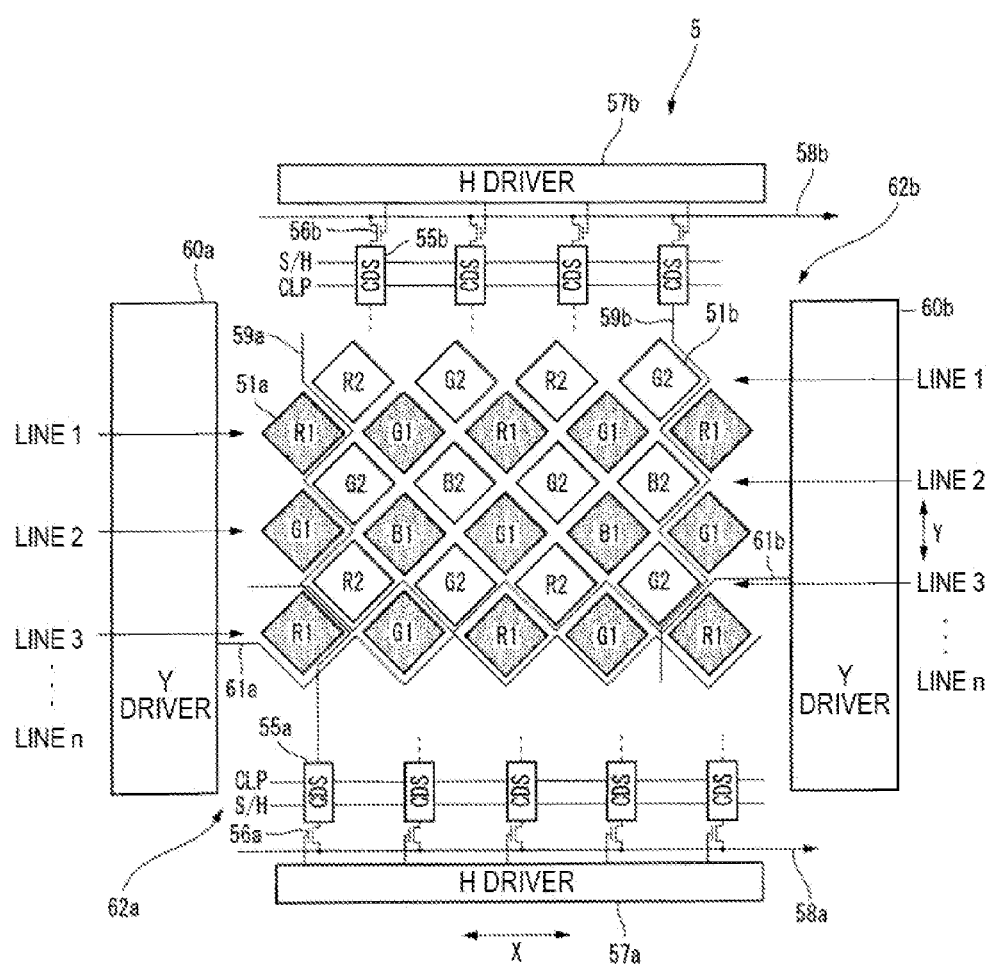
FIG. 2 is a plan view illustrating a schematic configuration of a solid state imaging device 5 in the imaging apparatus illustrated in FIG. 1.

FIG. 2 is a plan view schematically illustrating a configuration of the solid state imaging device 5 in the imaging apparatus 100 illustrated in FIG. 1.

As illustrated in FIG. 2, the solid state imaging device 5 includes a first group made up of a plurality of photoelectric conversion elements 51a (which are hatched), a second group made up of a plurality of photoelectric conversion elements 51b, and a signal read-out circuit 61a installed to correspond to the first group, and a signal read-out circuit 61b installed to correspond to the second group.

All the photoelectric conversion elements included in the solid state imaging device 5 are disposed in a two-dimensional pattern in a row direction X of a semiconductor substrate surface and a column direction Y intersecting the row direction (crossing at right angles in the example of FIG. 2). All the photoelectric conversion elements are arranged in such a manner that a plurality of lines made up of photoelectric conversion elements 51a and arranged in parallel at a constant pitch to the row direction X and a plurality of lines made up of of photoelectric conversion elements 51b and arranged in parallel at the same pitch as the constant pitch to the row direction X are alternately arranged in parallel at a constant pitch in the column direction Y.

Furthermore, the lines of the first group are disposed to be shifted relative to the the lines of the second group in the row direction X by one half of the array pitch of the respective photoelectric conversion elements of each line in the row direction X. This array can be obtained by disposing the photoelectric conversion elements 51b at positions offset obliquely in a 45° direction with respect to the respective photoelectric conversion elements 51a disposed in a square lattice pattern.

As such, the photoelectric conversion elements 51b are disposed adjacent to all the photoelectric conversion elements 51a in the same positional relationship. Thus, each photoelectric conversion element 51a and the photoelectric conversion element 51b adjoining the photoelectric conversion element 51a in the same positional relationship (in the same direction) pair up with each other.

All the photoelectric conversion elements included in the solid state imaging device 5 have approximately the same configuration (the same design value). The term "approximately the same configuration" means that sizes of the photoelectric conversion regions (photodiodes) formed within a semiconductor substrate are approximately the same, and that opening sizes of the light-shielding films formed above the photoelectric conversion regions are approximately the same.

Over each of the photoelectric conversion elements 51a, a color filter R1 transmitting red light, a color filter G1 transmitting green light, or a color filter B1 transmitting blue light is installed, in which the color filters R1, R2, R3 are disposed in a Bayer array as a whole.

In FIG. 2, the letter "R1" is given to a photoelectric conversion element 51a over which a color filter R1 is installed. Further, the letter "G1" is given to a photoelectric conversion element 51a over which a color filter G1 is installed. In addition, the letter "B1" is given to a photoelectric conversion element 51a over which a color filter B1 is installed.

Over each of the photoelectric conversion elements 51b, a color filter R2 transmitting red light, a color filter G2 transmitting green light, or a color filter B2 transmitting blue light is installed, in which the color filters R2, G2, B2 are disposed in a Bayer array as a whole.

In FIG. 2, the letter "R2" is given to a photoelectric conversion element 51b over which a color filter R2 is installed. Further, the letter "G2" is given to a photoelectric conversion element 51b over which a color filter G2 is installed. In addition, the letter "B2" is given to a photoelectric conversion element 51b over which a color filter B2 is installed.

As such, the same color filters (the red filters, the green filters, or the blue filters) are respectively disposed over the photoelectric conversion elements 51a and the photoelectric conversion elements 51b that are adjacent to each other in the same positional relationship (in the example illustrated in FIG. 2, the photoelectric conversion elements 51a and the photoelectric conversion elements 51b obliquely adjacent thereto in the right upper direction). Accordingly, three types of pairs that are different in color of filter installed atop (R pairs with a red filter installed atop, G pairs with a green filter installed atop, and B pairs with a blue filter installed atop) are included in this solid state imaging device 5.

As illustrated in FIG. 2, the lines of the first group are referred to sequentially as a first line, a second line, a third line, . . . , n-th line from the top in FIG. 2. The lines of the second group are also referred to sequentially as a first line, a second line, a third line, . . . , n-th line from the top in FIG. 2. The respective photoelectric conversion elements 51b, which pair up with the respective photoelectric conversion elements 51a included in the k-th line (k=1, 2, 3, . . . , n) of the first group, form the k-th line (k=1, 2, 3, . . . , n) of the second group.

A CMOS circuit, which is not illustrated, is provided correspondingly in the vicinity of each of all the photoelectric conversion elements included in the solid state imaging device 5.

A signal read-out circuit 62a includes CDS circuits 55a, transistors 56a, an H driver 57a, a signal output line 58a, a wiring 59a (only partly illustrated), a V driver 60a, and a wiring 61a (only partly illustrated). The signal read-out circuit 62a is controlled by the device control unit 8 as illustrated in FIG. 1.

The wiring 61a is connected to the MOS circuits corresponding to each line of the first group. The wiring 61a is connected to the V driver 60a.

The V driver 60a performs a driving to select the lines of the first group one by one and to read signal to the wiring 59a from the MOS circuits corresponding to the selected line. Further, the V driver 60a. also performs a driving to control the reset transistors of the MOS circuits corresponding to the photoelectric conversion elements 51a of the first group so as to reset the accumulated electrical charges in the photoelectric conversion elements 51a of the first group (a driving to exhaust the electrical charges of the photoelectric, conversion elements to the drains of the reset transistors of the MOS circuits).

The CDS circuits 55a are installed to correspond to the photoelectric conversion element columns constituted with a plurality of the photoelectric conversion elements 51a arranged in parallel to the column direction Y, respectively. Each of the CDS circuits 55a is connected to the CMOS circuit of the corresponding photoelectric conversion element column through the wiring 59a. The CDS circuits 55a perform a correlated double sampling of an input signal.

The H driver 57a is connected to each of the CDS circuits 55a through a transistor 56a. The H driver 57a turns ON the transistor 56a sequentially to allow signals processed in the CDS circuits 55a to be output to the signal output line 58a.

The signal read-out circuit 62b includes CDS circuits 55b, transistors 56b, an H driver 57b, a signal output line 58b, a wiring 59b (only partly illustrated), a V driver 60b, and a wiring 61b (only partly illustrated). The signal read-out circuit 62b is controlled by the device control unit 8 as illustrated in FIG. 1.

The wiring, 61b is connected to the MOS circuits corresponding to each line of the second group. The wiring 61b is connected to the V driver 60b.

The V driver 60b performs a driving to select the lines of the second group one by one and to read signal to the wiring 59b from the MOS circuits corresponding, to the selected line. Further, the V driver 60b also performs a driving to control the reset transistors of the MOS circuits corresponding to the photoelectric conversion elements 51b of the second group so as to reset the accumulated electrical charges in the photoelectric conversion elements 51b of the second group (a driving to exhaust the electrical charges of the photoelectric conversion elements to the drains of the reset transistors of the MOS circuits).

The CDS circuits 55b are installed to correspond to the photoelectric conversion element columns constituted with a plurality of the photoelectric conversion elements 51b arranged in parallel to the column direction Y. The CDS circuits 55b are connected to the MOS circuits of the corresponding photoelectric conversion element columns through the wiring 59b. The CDS circuits 55b perform a correlated double sampling of an input signal.

The H driver 57b is connected to each of the CDS circuits 55b through a transistor 56b. The H driver 57b turns ON the transistors 56b sequentially to allow signals processed in the CDS circuits 55b to be output to the signal output line 58b.

With this configuration, the captured image signal can be read from the first and second groups simultaneously.

The imaging apparatus 100 provided with the solid state imaging device 5 has a DR photographing mode in which the device control unit 8 performs a driving in which a first captured image signal according to electrical charges accumulated in the first photoelectric conversion elements 51a during the first exposure period and a second captured image signal according to electrical charges accumulated in the photoelectric conversion elements 51b during each of several second exposure periods are read by sequentially exposing the photoelectric conversion elements 51b for several second exposure periods during a period that overlaps with the first exposure period while simultaneously exposing, the photoelectric conversion elements 51a for the first exposure period. In the meantime, each of the second exposure periods overlaps with the first exposure period.

Furthermore, in a case of the DR photographing mode, the image processing unit 9 performs a DR processing that generates a captured image data having a dynamic range using a first captured image signal obtained during the first exposure period and at least one of second captured image signals obtained during the plurality of the second exposure periods.

In the DR processing, plural types of the DR processings different from each other in the number of the captured image signals used in generating the captured image data are included in the DR processing. For this reason, a dynamic range of the captured image data to be generated can be changed with changing a type of the DR processing performed by the image processing unit 9.

For example, when it is assumed that four second exposure periods each of which has the same exposure time are performed, the image processing unit 9 selectively performs four types of the DR processings to be described below to generate a captured image data having a dynamic range.

(First DR Processing)

The image processing unit 9 performs an image processing for the first captured image signal to generate a long-term exposed image data, performs an image processing for any one of four second captured image signals to generate a short-term exposed image data and combines these two image data to generate a captured image data having a dynamic range of 400%.

(Second DR Processing)

The image processing unit 9 performs an image processing for the first captured image signal to generate a long-term exposed image data, performs an image processing for any two of four second captured image signals, respectively, to generate two short-term exposed image data, and combines these three image data to generate a captured image data having a dynamic range of 200%.

(Third DR Processing)

The image processing unit 9 performs an image processing for the first captured image signal to generate a long-term exposed image data, performs an image processing for any three of four second captured image signals, respectively, to generate three short-term exposed image data, and combines these four image data to generate a captured image data having a dynamic range of 133%.

(Fourth DR Processing)

The image processing unit 9 performs an image processing for the first captured image signal to generate a long-term exposed image data, performs an image processing for each of four second captured image signals, respectively, to generate four short-term exposed image data, and combines these five image data to generate a captured image data having a dynamic range of 100%.

The image processing unit 9 determines which captured image data generated from which DR processing to be recorded on the memory card 11 based on the captured image data generated from at least one of the plural types of the DR processings. The image processing unit 9 allows the captured image data determined as such to be recorded on the memory card 11 from the media control unit 12.

Hereinafter, detailed operations of the imaging apparatus 100 in the case of the DR photographing mode.

Figure 3:
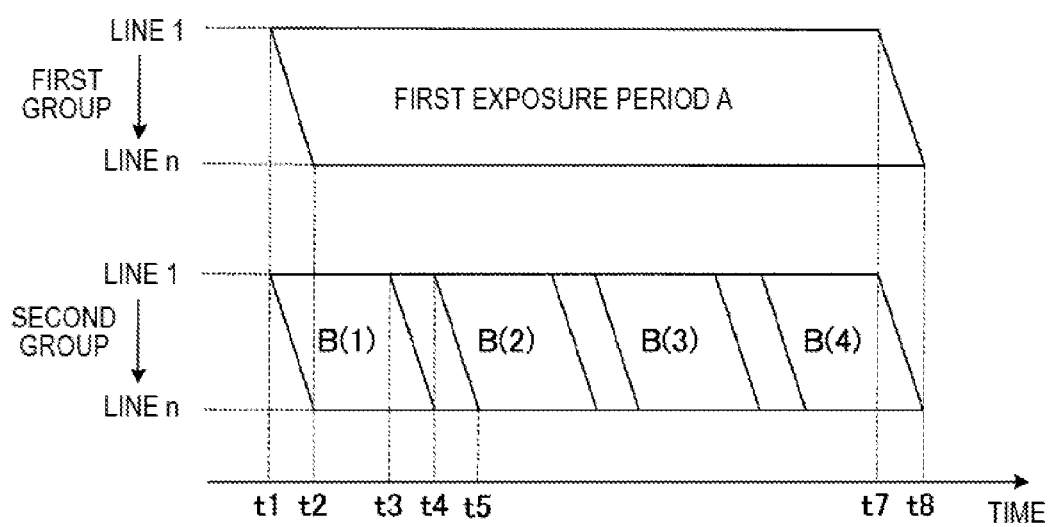
FIG. 3 is a timing chart for describing operations in a case of photographing by the imaging apparatus illustrated in FIG. 1.

FIG. 3 illustrates a driving timing chart of the solid state imaging device in a case of photographing of the imaging apparatus 100 illustrated in FIG. 1. FIG. 3 illustrates a relationship between exposure periods of the photoelectric conversion elements 51a of the first group and the photoelectric conversion elements 51b of the second group in detail.

In FIG. 3, an example in which four second exposure periods are included in the first exposure period is illustrated. In FIG. 3, a rectangular shape (parallelogram) denoted by a "first exposure period A" represents a first exposure period of the entirety of the first group, and each of rectangular shapes (parallelogram) denoted by "B(1)", "B(2)", "B(3)" and "B(4)" represents a second exposure period of the entirety of the second group. Lengths of the respective four second exposure periods (exposure time of each line) are set to the same length.

When a photographing command is issued, the device control unit 8 makes the V driver 60a perform a rolling reset driving to reset the accumulated electrical charges of the first group of the photoelectric conversion elements 51a for each line of the first group while varying timing. Further, the device control unit 8 makes the V driver 60b perform another rolling reset driving to reset the accumulated electrical charges of the second group of the photoelectric, conversion elements 51b for each line of the second group while varying timing. The V driver 60a and the V driver 60b reset the accumulated electrical charges by synchronizing the timing of reset in the k-th line of the first group with another timing of reset in the k-th line of the second group.

In the example illustrated in FIG. 3, between time t1 and time t2, the photoelectric conversion elements 51b in each line of the second group are sequentially reset simultaneously when the photoelectric conversion elements 51a in each line of the first group are sequentially reset. In each line of the first group, the exposure of the first exposure period A is started at the time when the resetting of the accumulated electrical charges is ended. In each line of the second group, the exposure of the second exposure period B(1) is started at the time when the resetting of the accumulated electrical charges is ended When a given length of time has elapsed after starting the exposure of the first line of the first group and the first line of the second group at time t1, and it arrives at time t3, the device control unit 8 makes the signal read-out circuit 62b perform a rolling read-out driving in which a signal according to the accumulated electrical charges of the photoelectric conversion elements 51b of the second group is read for each line of the second group while varying timing.

In the example illustrated in FIG. 3, the signal according to the accumulated electrical charges of the photoelectric conversion elements 51b of the second group is output from the solid state imaging device 5 between time t3 and time t4. In each line of the second group, the exposure of the second exposure period B(1) is ended when the reading-out of the signal according to the accumulated electrical charges of the photoelectric conversion elements 51b is ended.

At time t4, when the signal reading-out of the n-th line of the second group is ended, the device control unit 8 makes the V driver 60b perform a rolling reset driving. As illustrated in FIG. 3, between time t4 and time t5, a resetting for the accumulated electrical charges of the photoelectric conversion elements 51b of each line of the second group is performed. In each line of the second group, the exposure of the second exposure period B(2) is started at the time when the resetting performed between time t4 and time t5 is ended.

Thereafter, the rolling read-out driving is performed so that the exposure of the second exposure period B(2) is ended, and then the rolling reset driving is performed so that that the exposure of the second exposure period B(3) is started. Subsequently, the rolling read-out driving is performed so that the exposure of the second exposure period B(3) is ended, and then the rolling reset driving is performed so that the exposure of the second exposure period B(4) is started.

When it comes to time t7 that is an exposure end timing of the first exposure period A, the device control unit 8 makes the signal read-out circuit 62b perform the rolling read-out driving while simultaneously making the signal read-out circuit 62a perform the rolling read-out driving. The V driver 60a and the V driver 60b read signal between time t7 and time t8 by synchronizing the timing of signal reading-out according, to the accumulated electrical charges of the photoelectric conversion elements in the k-th line of the first group with the another timing of signal reading-out in the k-th line of the second group.

In the example in FIG. 3, between time t7 and time t8, signal according to the accumulated electrical charges of the photoelectric conversion elements 51a of each line of the first group is output from the solid state imaging device 5, and signal according to the accumulated electrical charges of the photoelectric conversion elements 51b of each line of the second group is output from the solid state imaging device 5.

In each line of the first group, the first exposure period A is ended at the time when the signal reading-out according to the accumulated electrical charges of the photoelectric conversion elements 51a is ended. In each line of the second group, the second exposure period B(4) is ended at the time when the signal reading-out according to the accumulated electrical charges of the photoelectric conversion elements 51b is ended.

With the driving as described above, it is possible that the second exposure periods B(1) to B(4) the first exposure period A are sequentially performed to output a total five captured image signals of four second captured image signals obtained from exposure of the four second exposure periods and a first captured image signal obtained from exposure of the first exposure period from the solid state imaging device 5.

Subsequently, operations until captured image data from the captured image signals output from the solid state imaging device 5 is generated and recorded according to the above-described driving will be described.

Figure 4:
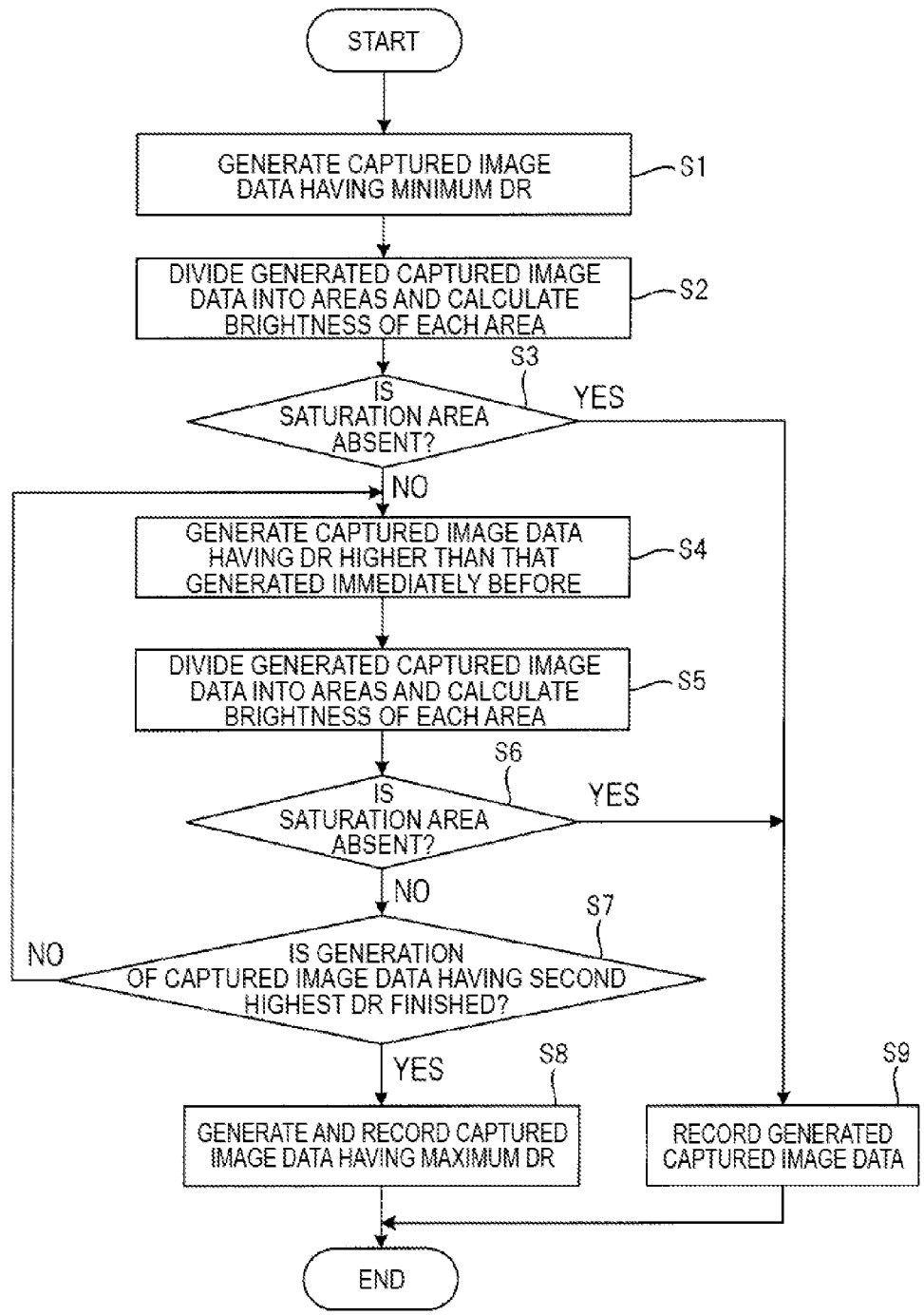
FIG. 4 is a flow chart for describing operations in a case of DR photographing mode of an imaging apparatus 100.

FIG. 4 is a flow chart for describing operations in the case of DR photographing mode of the imaging apparatus 100.

When a photographing is ended and a first captured image signal and four second captured image signals are stored in the memory 100, the image processing unit 9 performs a DR processing (the fourth DR processing) having the largest number of the second captured image signal used in the DR processing among four types of the DR processings to generate a captured image data of DR 100% (step S1).

Subsequently, the image processing unit 9 divides the captured image data generated at step S1 into a plurality of areas and calculates an average brightness of pixel data included in each divided area for the divided area (step S2).

Subsequently, the image processing unit 9 determines whether a divided area (saturation area), of which the average brightness is saturated, is present in the captured image data generated at step S1 (step S3).

Specifically, the image processing unit 9 determines whether the average brightness of the divided area, of which the average brightness calculated at step S2 becomes the maximum, reaches a saturation level. If the average brightness is less than the saturation level, the image processing unit 9 determines that a saturation area is absent since the average brightness is not saturated in all the divided areas. In the meantime, if the average brightness reaches the saturation level, the image processing unit 9 determines that the saturation area is present.

When the saturation area is absent (determination: YES) in the determination at step S3, the image processing unit 9 records the captured image data of DR 100% generated at step S1 in the memory card 11 (step S9) and ends the processing.

When the saturation area is present (determination: NO) in the determination at step S3, the image processing unit 9 performs a DR processing (the third DR processing) having the largest number of the second captured image signals used in a DR processing among four types of the DR processings after the DR processing performed immediately before to generate a captured image data of DR 133% (step S4).

Subsequently, the image processing unit 9 divides the captured image data generated at step S4 into a plurality of areas and calculates an average brightness for each divided area (step S5).

Subsequently, the image processing unit 9 determines whether a saturation area is present in the captured image data generated at step S4 based on the average brightness calculated at step S5 (step S6).

When a saturation area was absent (determination: YES) in the determination at step S6, the image processing unit 9 records the captured image data of DR 133% generated at step S4 in the memory card 11 (step S9) and ends the processing.

In the meantime, when a saturation area was present (determination: NO) in the determination at step S6, the image processing unit 9 determines whether a DR processing (the second DR processing) having the second smallest number of the second captured image signals used in a DR processing among four types of the DR processings was previously performed (step S7).

When the second DR processing was not performed (determination: NO) in the determination at step S7, the image processing unit 9 performs the processings after step S4.

When the second DR processing was performed (determination: YES) in the determination at step S7, the image processing unit 9 performs a DR processing (the first DR processing) having the smallest number of the second captured image signals used in a DR processing among four types of the DR processings to generate a captured image data of DR 400% (step S4). The image processing unit 9 records the captured image data of DR 400% in the memory card 11 (step S8) and ends the processing.

Like this, in the case of the DR photographing mode, the image processing unit 9 records any of the captured image data in which a saturation area is absent in the memory card 11 (step S9) among the captured image data obtained from the DR processing other than the first DR processing among four types of the DR processings. When a DR processing, of which the saturation area is absent, is absent (step S7: YES), the image processing unit 9 records a captured image data obtained from the first DR processing having the smallest number of the second captured image signals used in a DR processing among four types of the DR processings is recorded on the memory card 11 (step S8).

By doing this, the captured image data recorded at step S9 may have a good image quality with no saturation area. Further, there is a possibility that a saturation area is present in the captured image data recorded at step S8, but since the captured image data having the maximum dynamic range settable in the imaging apparatus 100 is recorded, the captured image data with better image quality as compared to a case where the captured image data obtained from other processing can be recorded.

In the related art, a dynamic range is determined before a photographing according to a user's setting or a photographing scene and then the photographing is performed. For this reason, it is unable to change the dynamic range after photographing. Further, changing of an exposure time is needed in order to change the dynamic range. Therefore, since it is needed to have a driving pattern according to the number of the settable dynamic ranges in advance, it is not easy to design the driving pattern of the solid state imaging device.

In contrast to this, the imaging apparatus 100 has a driving pattern realizing the driving illustrated in FIG. 3. Accordingly, it is possible to change the contents of the DR processing to respond to the change of the dynamic range. Therefore, it is possible to simplify the design of the driving pattern of the solid state imaging device 5 as well as to change the dynamic range after photographing.

Further, in the conventional imaging apparatus, since the photographing is performed after the dynamic range is determined, it is unable to respond to a case where the brightness of a subject is changed immediately before the photographing. In contrast to this, the imaging apparatus 100 can determine the dynamic range based on the captured image data obtained by actual photographing. For this reason, even when the brightness of a subject is changed immediately before the photographing, it is possible to determine the optimal dynamic range responding to the change of the brightness of the subject.

In the meantime, in the flow chart illustrated in FIG. 4, in order to reduce a processing load of the image processing unit 9, four types of the DR processings are performed in an ascending order of the number of the second captured image signals used in the DR processing. However, when the processing load is not taken into account, it may not be performed as such.

For example, the image processing unit 9, for the first time, performs all the four types of the DR processings to generate four captured image data. Subsequently, a captured image data with no saturation area is searched for three captured image data except for a captured image data having the maximum DR among the four captured image data. When the captured image data with no saturation area is present, the captured image data is allowed to be recorded. In the meantime, when the captured image data with no saturation area is absent, the image processing unit 9 allows the captured image data having the maximum DR to be recorded.

Further, the operations of the image processing unit 9 in the case of the DR photographing mode may be changed as follows.

Figure 5:
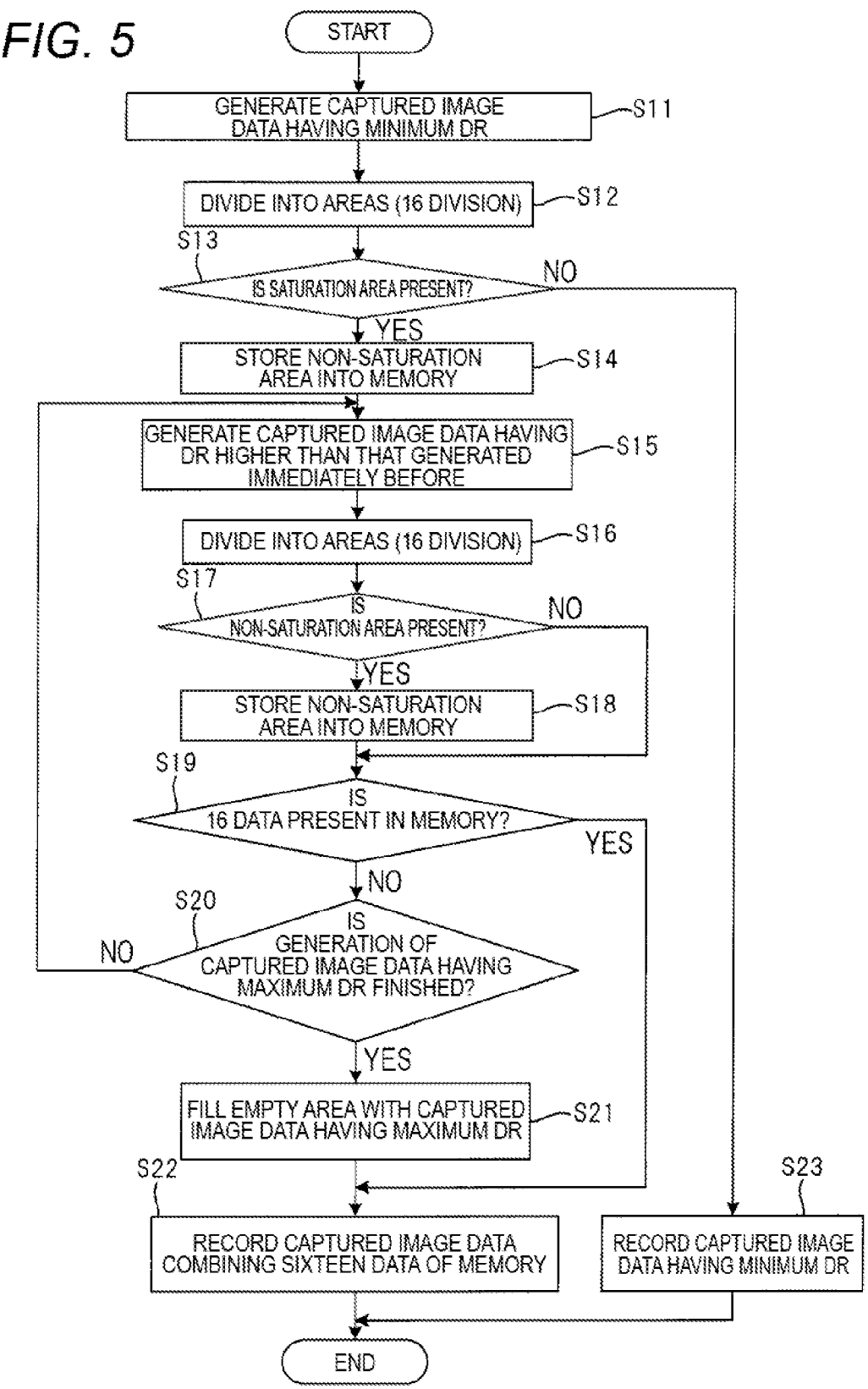
FIG. 5 is a flow chart for describing a modified example of operations in a case of DR photographing mode of the imaging apparatus 100.

FIG. 5 is a flow chart for describing a modified example of operations in the case of DR photographing mode of the imaging apparatus 100.

When a photographing is ended and a first captured image signal and four second captured image signals are stored in the memory 100, the image processing unit 9 performs a DR processing (the fourth DR processing) having the largest number of the second captured image signals used in a DR processing among the four types of the DR processings to generate a captured image data of DR 100% (step S11).

Subsequently, the image processing unit 9 divides the captured image data generated at step S11 into a plurality of areas (here, divided into sixteen areas) and calculates an average brightness of the pixel data for each of the sixteen divided areas (step S12).

Subsequently, the image processing unit 9 determines whether there is a saturation area is present in the captured image data generated at step S11 based on the average brightness calculated at step S12 (step S13).

When a saturation area was absent (determination: NO) in the determination at step S13, the image processing unit 9 records the captured image data of DR 100% generated at step S11 in the memory card 11 (step S23) and ends the processing.

When the saturation area was present (determination: YES) in the determination at step S13, the image processing unit 9 stores data of a non-saturated area other than the saturated area of the captured image data generated at step S11 in the memory 10 (step S14).

Sixteen areas corresponding to sixteen divided areas are set in the memory 10. Further, for example, as illustrated in FIG. 6, when four divided areas located at central portion among sixteen divided areas of the captured image data of DR 100% were non-saturated areas, the image processing unit 9 stores each of these four non-saturated areas in the respective corresponding areas of the memory 10.

Subsequently, the image processing unit 9 performs a DR processing (the third DR processing) having the largest number of the second captured image signals used in a DR processing among four types of the DR processings after a DR processing performed immediately before to generate a captured image data of DR 133% (step S15).

Subsequently, the image processing unit 9 divides the captured image data generated at step S15 into sixteen areas and calculates an average brightness for each of the sixteen divided areas (step S16).

Subsequently, the image processing unit 9 determines whether a non-saturation area is present in the captured image data generated at step S15 based on the average brightness calculated at step S16 (step S17).

When the determination at step S17 is NO, the image processing unit 9 performs the processing of step S19, and when the determination is YES, the image processing unit 9 performs the processing of step S18.

At step S18, the image processing unit 9 stores data of the non-saturation area in the captured image data generated at step S15 in the memory 10. For example, as illustrated in FIG. 7, when eight divided areas located at central portion among sixteen divided areas of the captured image data of DR 133% were non-saturated areas, the image processing unit 9 stores each of these eight non-saturated areas in the respective corresponding areas of the memory 10. However, when other data is stored in the area of the memory 10, the area is not overwritten with data.

At step S19, the image processing unit 9 determines whether data are previously stored in the sixteen areas of the memory 10.

When the data was stored in all the sixteen areas of the memory 10 (determination: YES) in the determination at step S19, the image processing, unit 9 generates the captured image data combining the data of the sixteen areas stored in the memory 10 to be recorded on the memory card 11 (step S22) and end the processing.

When the data was not stored in all the sixteen areas of the memory 10 (determination: NO) in the determination at step S19, the image processing unit 9 determines whether the DR processing (the first DR processing) having the smallest number of the second captured image signal used in a DR processing among four types of the DR processings is previously performed (step S20).

When the first DR processing was not performed (determination: NO) in the determination at step S20, the image processing unit 9 performs the processings after step S15.

When the first DR processing was performed (determination: YES) in the determination at step S20, the image processing unit 9 stores a divided area corresponding to an empty area, where the data of the memory was not stored, of the captured image data generated in the first DR processing in the empty area (step S21).

For example, as illustrated in FIG. 8, two empty areas are present in the memory 10 even though the captured image data of DR 400% is already generated, the divided areas (saturation areas in an example of FIG. 8) of the captured image data of DR 400% corresponding to the empty areas are stored in the corresponding areas of the memory 10.

After step S21, the image processing unit 9 performs processing of step S22 to allow the captured image data to be recorded, and ends the processing.

As described above, in this modified example, the image processing unit 9 preferentially selects the respective non-saturation areas of the four captured image data obtained from four types of the DR processings from the non-saturation areas obtained from an ascending order of the DR processings having the number of the second captured image signals used in the DR processing and combines the selected non-saturation areas to generate a captured image data. Further, when the number of the selected non-saturation areas is insufficient, the image processing unit 9 supplements shortage with the saturation areas of the captured image data of DR 400% obtained from a DR processing having the smallest number of the second captured image signals used in the DR processing to generate the captured image data.

With this configuration, the captured image data recorded on the memory card 11 at step S22 becomes a captured image data having different dynamic ranges for each divided area, for example, as illustrated in FIG. 9.

The smaller the dynamic range of four captured image data generated from the four types of the DR processings, the better the image quality thereof. For this reason, a resultant captured image data is generated by preferentially using the captured image data with high image quality (wide dynamic range) among the four captured image data for the non-saturated area so that it is possible to achieve both wide dynamic range and high image quality.

In the meantime, in the description so far, the image processing unit 9 automatically determines which captured image data to be recorded on the memory card 11 based on the captured image data obtained from at least one of the four types of the DR processings. However, the image processing unit 9 may determine the captured image data to be recorded on the memory card 11 according to instructions from a user.

For instance, the user sets a desired dynamic range through the manipulation unit 16 in the case of DR photographing mode. The image processing unit 9 selects and performs a DR processing with Which the captured image data having the dynamic range instructed through the manipulation unit 16 can be obtained among the four types of the DR processings, and allows the captured image data obtained from the DR processing to be recorded on the memory card 11. By doing this, the captured image data that suits user preference can be recorded without changing the driving of the solid state imaging device 5.

Further, the image processing unit 9 may perform all the four types of the DR processings to generate four captured image data in the case of DR photographing mode and allow the generated data to be recorded on the memory card 11. By doing this, the user can obtain four captured image data having different dynamic range for the same subject. In a dynamic range setting method before photographing, when the dynamic range was not optimum, the photographing fails, but if it is configured such that four captured image data are recorded, chances of photographing failure can be reduced.

Further, the image processing unit 9 may perform all the four types of the DR processings to generate four captured image data in the case of the DR photographing mode and allow only the captured image data selected by the user among them to be recorded on the memory card 11.

For instance, the image processing unit 9 generates four captured image data and then displays the generated four captured image data on the display unit 14 to allow the user to select which captured image data to be recorded. The image processing unit 9 records only the captured image data selected from the user through the manipulation unit 16 on the memory card 11. By doing this, an amount of data to be recorded on the memory card 11 can be reduced so that the number of photographing recording can be increased. Selecting of the captured image data among, the four captured image data for recording is not limited to one, but two or more captured image data may be selected for recording.

Further, in the flowchart illustrated in FIG. 5, the image processing unit 9 automatically selects sixteen divided areas constituting the captured image data to be recorded on the memory card 11 among, the four captured image data. However, user may arbitrarily determine which captured image data having a certain dynamic range to be used in the sixteen divided areas.

For instance, the image processing unit 9 generates four captured image data and then allows one (having the minimum dynamic range; a captured image data of DR 100%) of the four captured image data to be displayed on the display unit 14. The image allowed to be displayed on the display unit 14 is displayed by being divided into sixteen areas. The user designates a dynamic range for each of the sixteen divided areas. The image processing unit 9 stores the sixteen divided areas in the memory 10 according to the designation to generate a captured image data, and allows the generated captured image data to be recorded on the memory card 11, and ends the processing.

By doing this, a user can adjust the dynamic range for each divided area to generate a desired captured image data.

Figure 10:
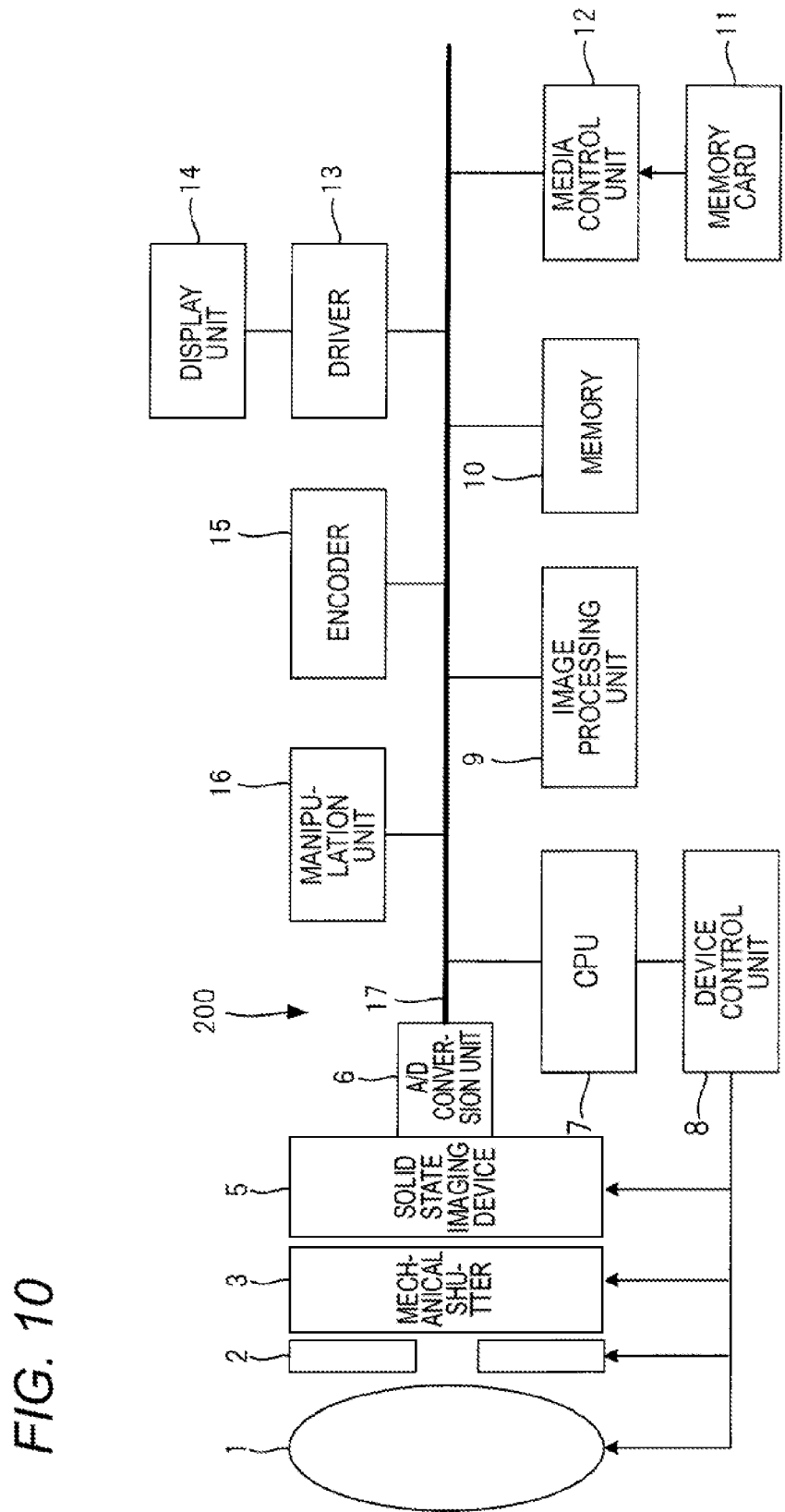
FIG. 10 is a view illustrating a modified example of the imaging apparatus illustrated in FIG. 1.

FIG. 10 is a view illustrating a modified example of the imaging apparatus illustrated in FIG. 1.

An imaging apparatus 200 illustrated in FIG. 10 has the same configuration as that of the imaging apparatus 100 illustrated in FIG. I except that a mechanical shutter 3 is additionally provided in the light incident side of the solid state imaging device 5 (between the diaphragm 2 and the solid state imaging device 5 in the example of FIG. 10).

Hereinafter, a driving method of the solid state imaging device 5 when the imaging apparatus 200 is in a DR photographing mode will be described.

Figure 11:
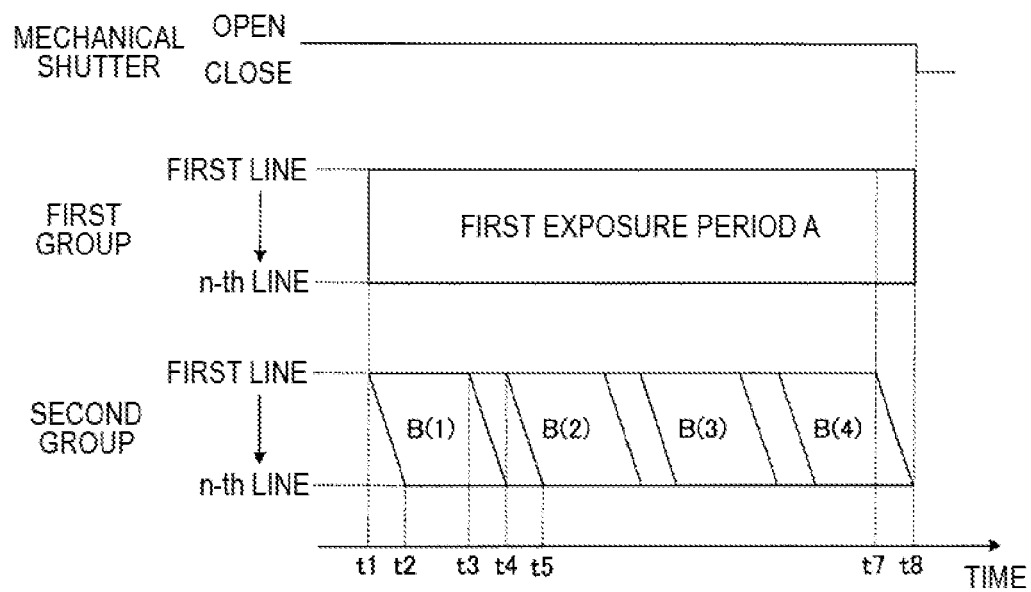
FIG. 11 is a timing chart for describing operations in a case of photographing by the imaging apparatus illustrated in FIG. 10.

FIG. 11 illustrates a timing chart for describing operations of the solid state imaging device when the imaging apparatus 200 is in a DR photographing mode. The timing chart illustrated in FIG. 11 is different from that illustrated in FIG. 3 in that the first exposure period A is started by performing a global reset driving that simultaneously reset the accumulated electrical charges of all the photoelectric conversion elements 51a of the first group, and in that the exposure of the first exposure period A is ended by performing a driving that closes the mechanical shutter 3.

When a photographing command is issued at time t1 while the mechanical shutter 3 is in an open state, the device control unit 8 makes the V driver 60a perform the global reset driving to simultaneously reset of the electrical charges of the respective photoelectric conversion elements 51a of the first group. In the first group, the exposure of the first exposure period A is started at the time when the global reset is ended.

In the meantime, as illustrated in FIG. 3, the electrical charges accumulated in each line of the second group are sequentially reset according to the photographing command at time t1, and the exposure of the second exposure period B(1) is started at the time when the resetting is ended. The operations from the starting of the exposure of the second exposure period B(1) to the end of the second exposure period B(4) are the same as those described in FIG. 3.

When it arrives at time t7, the device control unit 8 makes the signal read-out circuit 62b perform the rolling read-out driving. When it arrives at time t8 at which the signal reading-out is ended, the device control unit 8 makes the mechanical shutter 3 to be in closed state.

As described above, it is possible to coincidently start and end timings of exposure for all the lines of the first group by using the mechanical shutter 3 according to the imaging apparatus 200. Therefore, it is possible to remove distortions that occur on a moving subject specific to the CMOS sensor for the captured image data obtained from the first group.

In the meantime, in the imaging apparatus 200, it may be possible that the global reset driving which simultaneously reset the accumulated elecatrical charges of the respective photoelectric conversion elements 51b of the second group is performed to start the exposure of the second exposure period B(1). Furthermore, the exposure of the second exposure period B(4) may be ended by closing the mechanical shutter 3.

However, in this driving method, exposure times of second exposure period B(1) and second exposure period B(4) do not become uniform in each line of the second group. In contrast to this, in the driving method as illustrated in FIG. 11, an exposure time of any of the second exposure periods B(1) to B(4) can be uniform in each line of the second group. Therefore, it is possible to prevent brightness of the plurality of the captured image signal obtained from the second group from being blurred.

Figure 12:
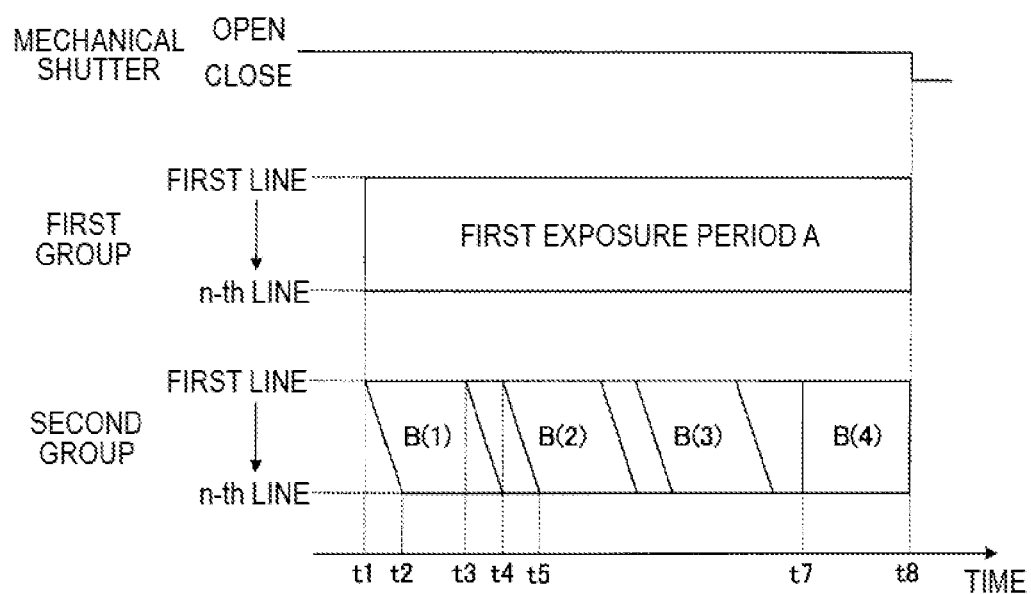
FIG. 12 is a timing chart for describing other operations in a case of photographing by the imaging apparatus illustrated in FIG. 10.

FIG. 12 is a timing chart illustrating a modified example of the driving method illustrated in FIG. 11. The timing chart illustrated in FIG. 12 is the same as that illustrated in FIG. 11 except that the exposure of last second exposure period B(4) of the plurality of the second exposure periods performed during an exposure of the first exposure period A is started by performing the global reset driving and is ended with closing the mechanical shutter 3.

In the timing chart illustrated in FIG. 12, operations of times t1 to t5 are the same as those illustrated in FIG. 11. In the n-th line of the second group, after an exposure of the second exposure period B(3) is ended, the device control unit 8 makes the V driver 60b perform the global reset driving in which the accumulated electrical charges of the respective photoelectric conversion elements 51b are reset simultaneously. An exposure of the second exposure period B(4) is started at the time when the resetting of the accumulated electrical charges of the photoelectric conversion elements 51b by the global reset driving is ended.

When a given length of time has elapsed after starting the exposure of the second exposure B(4), and it arrives at time t8, the device control unit 8 drives the mechanical shutter 3 to be closed. The first exposure period A and the second exposure period B(4) are ended from the time when the mechanical shutter 3 is closed. After the first exposure period A is ended, the device control unit 8 performs a rolling read-out driving to read the captured image signals from the first group and the second group, respectively.

As described above, according to the driving method illustrated in FIG. 12, start timing and end timing of the last second exposure period among the plurality of second exposure periods can be coincident with each other for the respective lines of the second group. Therefore, image distortion cannot occurred in the captured image signal obtained during the second exposure period B(4), so that image quality can be improved.

In the meantime, when a moving subject is photographed in the case of the DR photographing mode, the image processing unit 9 may record the captured image data obtained from a first processing (but, the second captured image signal obtained during the second exposure period B(4) is used) on the memory card 11. By doing this, the dynamic range forcibly becomes 400%, but occurrence of distortion disappears so that an image quality can be increased.

In the description so far, the signal read-out circuit 62a and the signal read-out circuit 62b are installed separately in the first group and the second group, respectively, but it may be configured as a general MOS sensor by integrating the signal read-out circuit into a single signal read-out circuit.

However, when single signal read-out circuit is installed, the k-th lines of the first group and the second group cannot be synchronously driven. For this reason, for example, in order to realize the driving method illustrated in FIG. 3, it is needed that a rolling reset driving for starting the second exposure period B(1) is performed after a rolling reset driving for starting the first exposure period A is ended, and a rolling read-out driving for ending the second exposure period B(4) is performed after a rolling read-out driving for ending the first exposure period A is ended, as illustrated in FIG. 13.

Figure 14:
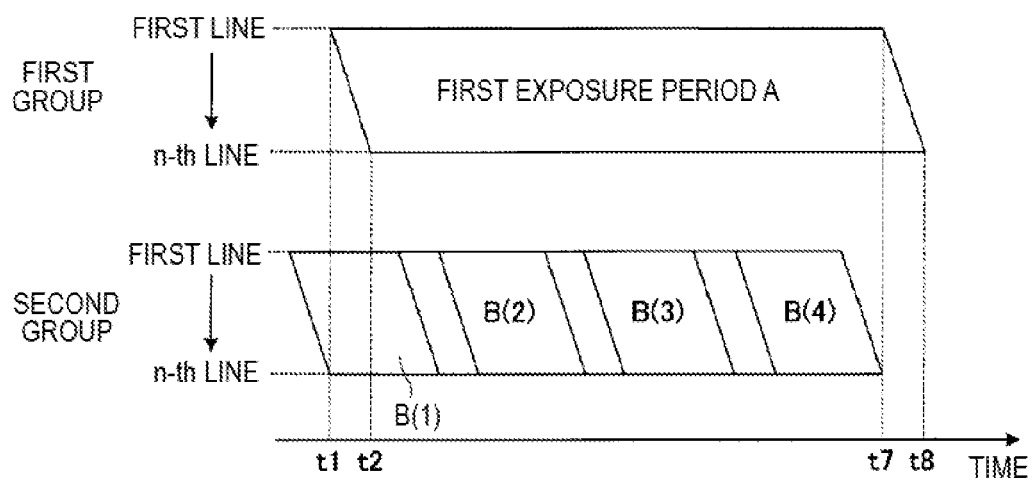
FIG. 14 is a view illustrating another example of a timing chart for implementing the driving method illustrated in FIG. 3 with a single signal read-out circuit.

Otherwise, as illustrated in FIG. 14, it is needed that a rolling reset driving for starting the first exposure period A is performed after a rolling reset driving for starting the second exposure period B(1) is ended, and a rolling read-out driving for ending the first exposure period A is performed after a roiling read-out driving for ending the second exposure period B(4) is ended.

Figure 13:
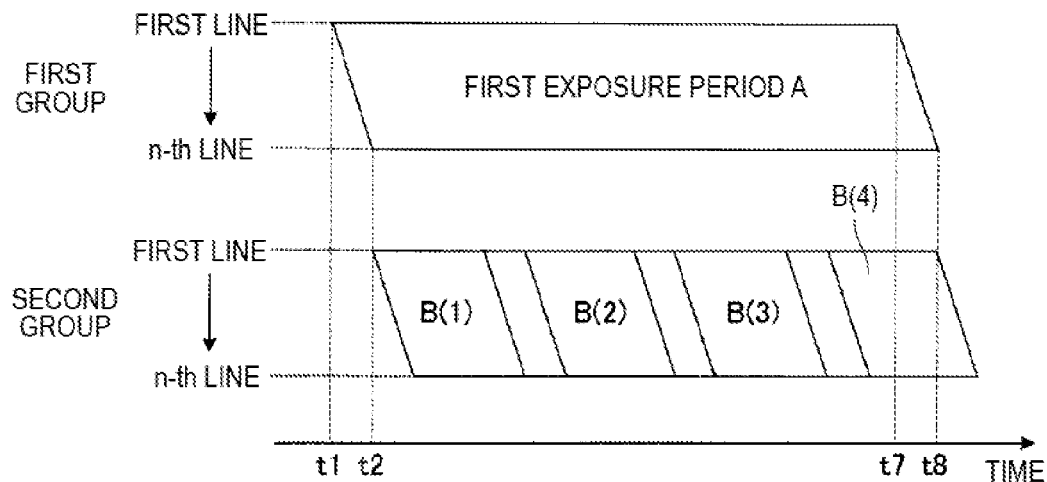
FIG. 13 is a view illustrating an example of a timing chart for implementing the driving method illustrated in FIG. 3 with a single signal read-out circuit.

However, even in the driving methods illustrated in FIGS. 13 and 14, the first exposure period A overlaps with each of the second exposure periods B(1) to B(4). For this reason, a correlation between the captured image signal obtained during the first exposure period A and those obtained during each of the second exposure periods B(1) to B(4) becomes sufficiently high, so that the image quality of the captured image data obtained from the first DR processing to the fourth DR processing is not affected much. As illustrated in FIG. 2, in a configuration in which two signal read-out circuits are installed, the exposure for the entirety of the plurality of the second exposure periods can be performed during exposure of the first exposure period. Therefore, a high image quality of the captured image data can be achieved.

By doing this, the photoelectric conversion elements 51a of the first group and the photoelectric conversion elements 51b of the second group goes in a state in which electrical charges can be accumulated. In each line of the first group, the exposure of the first exposure period A is started and in each line of the second group, the exposure of the second exposure period B is started.

The arrangement of the photoelectric conversion elements of the solid state imaging device 5 illustrated in FIG. 2 may be modified as follows.

Figure 15:
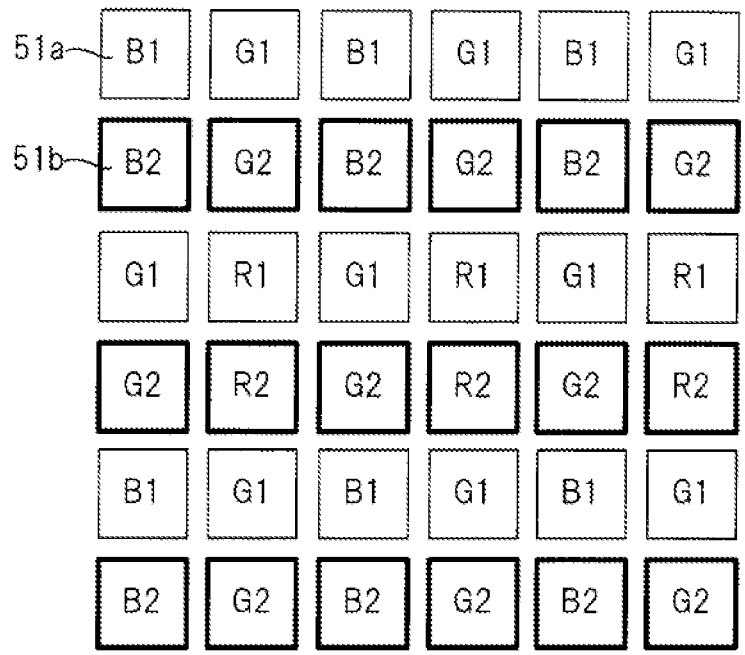
FIG. 15 is a view illustrating a modified embodiment of the solid state imaging device illustrated in FIG. 2.

FIG. 15 is a view illustrating a modified embodiment of the solid state imaging device illustrated in FIG. 2. The solid state imaging device of the modified embodiment is configured such that the plurality of the photoelectric conversion elements are arranged in a square lattice pattern in which photoelectric conversion elements 51a are arranged in odd-numbered rows and photoelectric conversion elements 51b are arranged in even-numbered rows.

Figure 16:
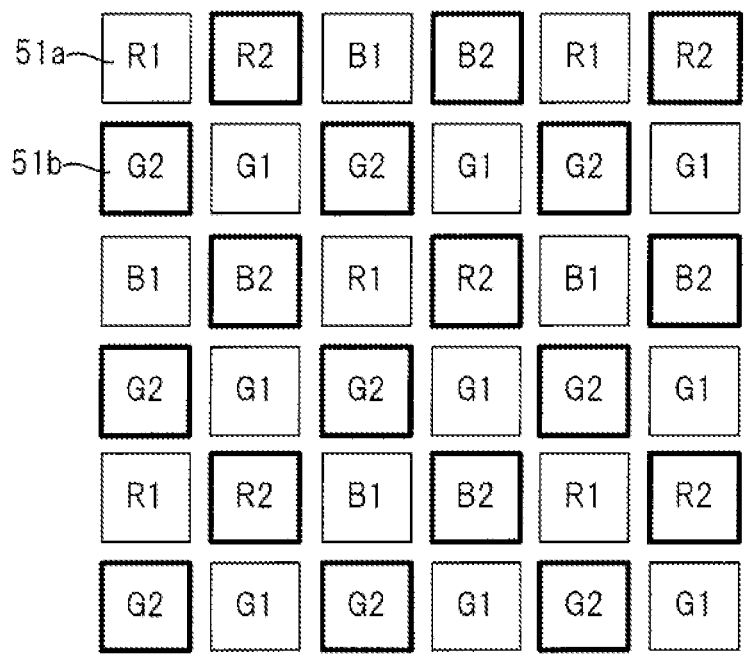
FIG. 16 is a view illustrating another modified embodiment of the solid state imaging device illustrated in FIG. 2.

FIG. 16 is a view illustrating another modified embodiment of the solid state imaging device illustrated in FIG. 2. The solid state imaging device of the modified embodiment is configured such that the plurality of the photoelectric conversion elements are arranged in a square lattice pattern in which photoelectric conversion elements 51a are arranged in checkered pattern positions and photoelectric conversion elements 51b are arranged in other checkered pattern positions.

Even in the arrangements illustrated in FIGS. 15 and 16, a color image data having a widened dynamic range by combining a pixel data corresponding to the respective photoelectric conversion element 51a of the first group and the a pixel data corresponding to the respective photoelectric conversion elements 51b that forms a pair with the photoelectric conversion element 51a.

In the description as described above, the solid state imaging device 5 is a MOS type solid state imaging device, but may be a CCD type solid state imaging device.

Figure 17:
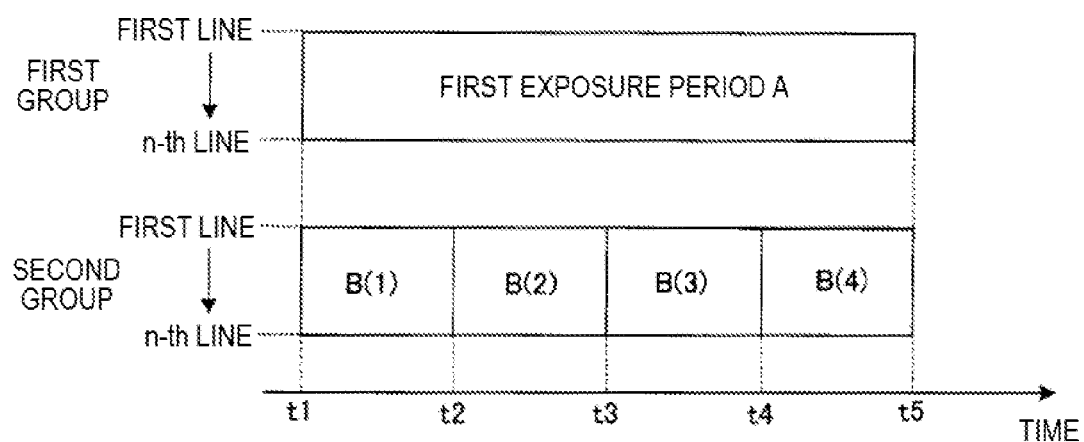
FIG. 17 is a timing chart for describing operations in a case of photographing when the solid state imaging device in the image apparatus illustrated in FIG. 1 is a CCD type solid state imaging device.

FIG. 17 is a timing chart for describing operations in a case of photographing by the imaging apparatus when the solid state imaging device 5 of the image apparatus 100 illustrated in FIG. 1 is a CCD type solid state imaging device, and corresponds to FIG. 3.

In a case where the solid state imaging device 5 is a CMOS type solid state imaging device, when a photographing command is issued the device control unit 8 turns OFF the electronic shutter pulse (time t1). By doing this, the photoelectric conversion elements 51a of the first group and the photoelectric conversion elements 51b of the second group goes in a state in which electrical charges can be accumulated. In each line of the first group, the exposure of the first exposure period A is started and in each line of the second group, the exposure of the second exposure period B is started.

When a given length of time has elapsed from time t1, and it arrives at time t2, the device control unit 8 reads the electrical charges accumulated on the respective photoelectric conversion elements 51b of the second group onto vertical CCDs and transfers the read electrical charges to the amplifier to allow a signal according to the accumulated electrical charges to be output from the amplifier. In each line of the second group, the exposure of the second exposure period B(1) is ended and the exposure of the second exposure period B(2) is started simultaneously at the time when reading-out of the accumulated electrical charges onto the vertical CCDs is ended.

When it arrives time t3 that corresponds to end-time of exposure of B(2), the device control unit 8 reads the electrical charges accumulated on the respective photoelectric conversion elements 51b of the second group onto vertical CCDs and transfers the read electrical charges to the amplifier to allow a signal according to the accumulated electrical charges to be output from the amplifier. In each line of the second group, the exposure of the second exposure period B(2) is ended and the exposure of the second exposure period B(3) is started simultaneously at the time when reading-out of the accumulated electrical charges onto the vertical CCDs is ended.

When it arrives time t4 that corresponds to end-time of exposure of B(3), the device control unit 8 reads the electrical charges accumulated on the respective photoelectric conversion elements 51b of the second group onto vertical CCDs and transfers the read electrical charges to the amplifier to allow a signal according to the accumulated electrical charges to be output from the amplifier. In each line of the second group, the exposure of the second exposure period B(3) is ended at the time when reading-out of the accumulated electrical charges onto the vertical CCDs is ended.

When it arrives time t5 that corresponds to end-time of exposure of B(4), the device control unit 8 reads the electrical charges accumulated on the respective photoelectric conversion elements 51a and 51b onto vertical CCDs and transfers the read electrical charges to the amplifier to allow signal according to the accumulated electrical charges to be output from the amplifier. In each line of the first group, the exposure of the first exposure period A is ended and in each line of the second group, the exposure of the second exposure period B(4) is ended at the time when reading-out of the accumulated electrical charges onto the vertical CCDs is ended.

With such a driving as described above, the CCD type solid state imaging device can also acquire five captured image signal in a single photographing. In the CCD type solid state imaging device, it is possible to coincidently start and end timings of exposure for each line of any of the first group and second group in the entirety of the exposure periods. Accordingly, it is possible to obtain the captured image data without image distortion even for a moving subject.

As described above, the following matters are disclosed in the present specification.

The above-disclosed imaging apparatus is provided with a solid state imaging device that includes a plurality of first photoelectric conversion elements and a plurality of second photoelectric conversion elements arranged in a two-dimensional array. The imaging apparatus includes: a driving unit that performs a driving in which a first captured image signal according to electrical charges accumulated in the plurality of first photoelectric conversion elements during the first exposure period and a second captured image signal according to electrical charges accumulated in the plurality of second photoelectric conversion elements during each of several second exposure periods are read by sequentially exposing the plurality of second photoelectric conversion elements for the several second exposure periods while simultaneously exposing the plurality of first photoelectric conversion elements for a first exposure period; and an image processing unit that performs a processing in which a captured image signal with a dynamic range is generated by using the first captured image signal and at least one of the plurality of the second captured image signals, and each of the second exposure periods overlaps with the first exposure period and the processing includes plural types of processings where numbers of the second captured image signals to be used are different.

The image processing unit of the imaging apparatus determines a captured image data among the plurality of the captured image data generated from each of the plural types of the processings to be recorded on a recording, medium based on the captured image data generated from at least one of the plural types of the processings.

The image processing unit of the imaging apparatus allows any of the captured image data without the saturation area among the captured image data obtained from a processing other than another processing having the smallest number of the second captured image signals signals to be used among the plural types of the processings to be recorded on the recording medium, and when a captured image data without the saturation area is absent, the image processing unit allows the captured image data obtained from the processing having the smallest number of the second captured image signals to be used among the plural types of the processings to be recorded on the recording medium.

The image processing unit of the imaging apparatus performs the plural types of the processings in an ascending order of the number of the second captured image signals to be used, and determines whether the saturation area is present in the captured image data obtained from the processing other than the processing having the smallest number of the second captured image signals to be used each time when the processing is ended, and if the saturation area is absent, the captured image data is allowed to be recorded on the recording medium. When it is determined that the saturation area is present in the captured image data obtained from the processing having the second smallest number of the second captured image signals to be used, the captured image data obtained from a processing having the smallest number of the second captured image signals to be used is allowed to be recorded on the recording medium.

The image processing unit of the imaging apparatus selects the respective non-saturation areas of the plurality of the captured image data obtained from the plural types of processings first from non-saturation areas obtained from a processing having the largest number of the second captured image signals to be used, and generates the captured image data by combining the selected non-saturation areas.

When the number of the selected non-saturation areas is insufficient, the image processing unit of the imaging apparatus supplements a shortage with the saturation area of the captured image data obtained from a processing having the smallest number of the second captured image signals to be used.

The image processing unit of the imaging apparatus performs a processing in which the captured image data having the dynamic range instructed through the manipulation unit 16 among the plural types of the processings is obtained, and allows the captured image data obtained from the processing to be recorded on the recording medium.

The image processing unit of the imaging apparatus performs the respective plural types of the processings and allows all the captured image data obtained from the processing or a captured image data selected among them to be recorded on the recording medium.

The imaging apparatus further includes: a mechanical shutter installed in light incident side of the solid state imaging device, in which the solid state imaging device is a MOS type solid state imaging device the driving unit performs the global reset driving in which the accumulated electrical charges of the plurality of the first photoelectric conversion elements are simultaneously reset to make the first exposure period start, closes the mechanical shutter to make the first exposure period end after starting the first exposure period, and performs a rolling reset driving in which the accumulated electrical charges of the plurality of the second photoelectric conversion elements are reset for each line of the second photoelectric conversion elements while varying timings to make exposure periods except for at least last exposure period of the plurality of second exposure periods start.

The driving unit of the imaging apparatus performs the global reset driving in which the accumulated electrical charges of the plurality of the second photoelectric conversion elements are simultaneously reset to make the last exposure period of the plurality of second exposure periods start, and closes the mechanical shutter to make the last exposure period of the plurality of second exposure periods end.

The solid state imaging device of the imaging apparatus includes a first read-out circuit for reading the first captured image signal from the plurality of the first photoelectric conversion elements and a second read-out circuit, which is installed separately from the first read-out circuit, for reading the second captured image signal from the plurality of the second photoelectric conversion elements.

The above-described imaging method uses a solid state imaging device that includes a plurality of first photoelectric conversion elements and a plurality of second photoelectric conversion elements arranged in a two-dimensional array. The imaging method includes: a driving step of reading a first captured image signal according to electrical charges accumulated in the plurality of first photoelectric conversion elements during the first exposure period and a second signal according to electrical charges accumulated in each of the plurality of second photoelectric conversion elements during each of several second exposure periods are read by sequentially exposing the plurality of second photoelectric conversion elements for the several second exposure periods while simultaneously exposing the plurality of first photoelectric conversion elements for a first exposure period; and an image processing step of performing a processing in which a captured image signal with a dynamic range is generated by using the first captured image signal and at least one of the plurality of the second captured image signals, and each of the second exposure periods overlaps with the first exposure period and the processing includes plural types of processings where numbers of the second captured image signals to be used are different.

In the image processing step of the imaging method, a captured image data to be recorded on a recording medium among the plurality of the captured image data generated from each of the plural types of the processings is determined based on the captured image data generated from at least one of the plural types of the processings.

In the image processing step of the imaging method, any of the captured image data without the saturation area among the captured image data obtained from a processing other than another processing having the smallest number of the second captured image signals to be used among the plural types of the processings is allowed to be recorded on the recording medium, and when a captured image data without the saturation area is absent, the captured image data obtained from the processing having the smallest number of the second captured image signals to be used among the plural types of the processings is allowed to be recorded on the recording medium.

In the image processing step of the imaging method, the plural types of the processings are performed in an ascending order of the number of the second captured image signals to be used, and whether the saturation area is present in the captured image data obtained from the processing other than the processing having the smallest number of the second captured image signals to be used is determined each time when the processing is ended, and if the saturation area is present, the captured image data is allowed to be recorded on the recording medium. When it is determined that the saturation area is present in the captured image data obtained from the processing having the second smallest number of the second captured image signals to be used, the captured image data obtained from a processing having the smallest number of the second captured image signals to be used is allowed to be recorded on the recording medium.

In the image processing step of the imaging method, the respective non-saturation areas of the plurality of the captured image data obtained from the plural types of processings first from those obtained from processing having the largest number of the second captured image signals to be used is selected, and the captured image data is generated by combining the selected non-saturation areas.

In the image processing step of the imaging method, when the number of the selected non-saturation areas is insufficient, a shortage is supplemented with the saturation area of the captured image data obtained from a processing having the smallest number of the second captured image signals to be used.

In the image processing step of the imaging method, a processing in which the captured image data having the dynamic range instructed through the manipulation unit among the plural types of the processings is obtained is performed, and the captured image data obtained from the processing is allowed to be recorded on the recording medium.

In the image processing step of the imaging method, the respective plural types of the processings is performed and all the captured image data obtained from the processing or a captured image data selected among them is allowed to be recorded on the recording medium.

The solid state imaging device of the imaging method is a MOS type solid state imaging device, the driving unit performs the global reset driving in which the accumulated electrical charges of the plurality of the first photoelectric conversion elements are simultaneously reset to make the first exposure period start, closes the mechanical shutter installed in light incident side of the solid state imaging device to make the first exposure period end after starting the first exposure period, and performs a rolling reset driving in which the accumulated electrical charges of the plurality of the second photoelectric conversion elements are reset for each line of the second photoelectric conversion elements while varying timing to make exposure periods except for at least the last exposure period of the plurality of second exposure periods start.

In the driving step of the imaging method, the global reset driving in which the accumulated electrical charges of the plurality of the second photoelectric conversion elements are simultaneously reset is performed to make the last exposure period of the plurality of second exposure periods start, and closes the mechanical shutter to make the last exposure period of the plurality of second exposure periods end.

In the driving step of the imaging apparatus, the first captured image signal is read using a first read-out circuit and the second captured image signal is read using a second read-out circuit installed separately from the first read-out circuit.

Industrial Applicability

According to the present invention, it is possible to provide an imaging apparatus and an imaging method capable of determining a dynamic ranges after photographing.

Although the present invention is described with reference to the detailed and specific embodiments, it is apparent to those skilled in the art that various changes or modifications may be practiced without departing from the spirit and scope of the present invention.

The present application is based on Japanese Patent Application (Patent Application No. 2010-216107) filed on Sep. 27, 2010, the disclosure of which is incorporated herein by reference in its entirety.

Reference Signs List
  100: imaging apparatus,
  5: solid state imaging device
  8: device control unit
  51a, 51b: photoelectric conversion elements
  62a, 62b: signal read-out circuits

The invention claimed is:

1. An imaging apparatus provided with a solid state imaging device that includes a plurality of first photoelectric conversion elements and a plurality of second photoelectric conversion elements arranged in a two-dimensional array, the imaging apparatus comprising:
  a driving unit that performs a driving in which a first captured image signal according to electrical charges accumulated in the plurality of first photoelectric conversion elements during a first exposure period and a second captured image signal according to electrical charges accumulated in the plurality of second photoelectric conversion elements during each of several second exposure periods are read by sequentially exposing the plurality of second photoelectric conversion elements for the several second exposure periods while exposing the plurality of first photoelectric conversion elements for the first exposure period; and
  an image processing unit that performs a processing in which a captured image signal with a dynamic range is generated by using the first captured image signal and at least one of the plurality of the second captured image signals,
  wherein each of the second exposure periods overlaps with the first exposure period and the processing includes plural types of processing where numbers of the second captured image signals to be used are different,
  wherein the image processing unit determines a captured image data among the plurality of the captured image data generated from each of the plural types of the processing to be recorded on a recording medium based on the captured image data generated from at least one of the plural types of the processing, and
  wherein the image processing unit allows any of the captured image data without the saturation area among the captured image data obtained from a processing other than another processing having the smallest number of the second captured image signals to be used among the plural types of the processing to be recorded on the recording medium, and when a captured image data without the saturation area is absent, the image processing unit allows the captured image data obtained from the processing having the smallest number of the second captured image signals to be used among the plural types of the processing to be recorded on the recording medium.

2. The imaging apparatus of claim 1, wherein the image processing unit performs the plural types of the processing in an ascending order of the number of the second captured image signals to be used, and determines whether the saturation area is present in the captured image data obtained from the processing other than the processing having the smallest number of the second captured image signals to be used each time when the processing is ended, and if the saturation area is absent, the captured image data is allowed to be recorded on the recording medium, and when it is determined that the saturation area is present in the captured image data obtained from the processing having the second smallest number of the second captured image signals to be used, the captured image data obtained from a processing having the smallest number of the second captured image signals to be used is allowed to be recorded on the recording medium.

3. The imaging apparatus of claim 1, wherein the image processing unit selects the respective non-saturation areas of the plurality of the captured image data obtained from the plural types of processing first from the non-saturation areas obtained from a processing having the largest number of the second captured image signals to be used, and generates the captured image data by combining the selected non-saturation areas.

4. The imaging apparatus of claim 3, wherein when the number of the selected non-saturation areas is insufficient, the image processing unit supplements a shortage with the saturation area of the captured image data obtained from a processing having the smallest number of the second captured image signals to be used.

5. The imaging apparatus of claim 1, wherein the image processing unit performs a processing in which the captured image data having the dynamic range instructed through the manipulation unit among the plural types of the processing is obtained, and allows the captured image data obtained from the processing to be recorded on the recording medium.

6. The imaging apparatus of claim 1, wherein the image processing unit performs the respective plural types of the processing and allows all the captured image data obtained from the processing or a captured image data selected among them to be recorded on the recording medium.

7. The imaging apparatus of claim 1, further comprising:
a mechanical shutter installed in light incident side of the solid state imaging device,
wherein the solid state imaging device is a MOS type solid state imaging device,
the driving unit performs the global reset driving in which the accumulated electrical charges of the plurality of the first photoelectric conversion elements are simultaneously reset to make the first exposure period start, closes the mechanical shutter to make the first exposure period end after starting the first exposure period, and performs a rolling reset driving in which the accumulated electrical charges of the plurality of the second photoelectric conversion elements are reset for each line of the second photoelectric conversion elements while varying timings to make exposure periods except for at least last exposure period of the plurality of second exposure periods start.

8. The imaging apparatus of claim 6, wherein the driving unit performs the global reset driving in which the accumulated electrical charges of the plurality of the second photoelectric conversion elements are simultaneously reset to make the last exposure period of the plurality of second exposure periods start, and closes the mechanical shutter to make the last exposure period of the plurality of second exposure periods end.

9. The imaging apparatus of claim 1, wherein the driving part includes a first read-out circuit for reading the first captured image signal from the plurality of the first photoelectric conversion elements and a second read-out circuit, which is installed separately from the first read-out circuit, for reading the second captured image signal from the plurality of the second photoelectric conversion elements.

10. An imaging method using a solid state imaging device that includes a plurality of first photoelectric conversion elements and a plurality of second photoelectric conversion elements arranged in a two-dimensional array, the imaging method comprising:
a driving step of reading a first captured image signal according to electrical charges accumulated in the plurality of first photoelectric conversion elements during the first exposure period and a second signal according to electrical charges accumulated in each of the plurality of second photoelectric conversion elements during each of several second exposure periods are read by sequentially exposing the plurality of second photoelectric conversion elements for the several second exposure periods while simultaneously exposing the plurality of first photoelectric conversion elements for a first exposure period; and
an image processing step of performing a processing in which a captured image signal with a dynamic range is generated by using the first captured image signal and at least one of the plurality of the second captured image signals, wherein each of the second exposure periods overlaps with the first exposure period and the processing includes plural types of processing where numbers of the second captured image signals to be used are different,
wherein in the image processing step, a captured image data to be recorded on a recording medium among the plurality of the captured image data generated from each of the plural types of the processing is determined based on the captured image data generated from at least one of the plural types of the processing, and
wherein in the image processing step, any of the captured image data without the saturation area among the captured image data obtained from a processing other than another processing having the smallest number of the second captured image signals to be used among the plural types of the processing is allowed to be recorded on the recording medium, and when a captured image data without the saturation area is absent, the captured image data obtained from the processing having the smallest number of the second captured image signals to be used among the plural types of the processing is allowed to be recorded on the recording medium.

11. The imaging method of claim 10, wherein in the image processing step, the plural types of the processing are performed in an ascending order of the number of the second captured image signals to be used, the method further comprising:
determining each time the processing ends whether the saturation area is present in the captured image data obtained from the processing other than the processing having the smallest number of the second captured image signals to be used; and
allowing the captured image data to be recorded on the recording medium, in response to the saturation area being present, and wherein when the saturation area is present in the captured image data obtained from the processing having the second smallest number of the second captured image signals to be used, the captured image data recorded on the recording medium is the captured image data that is obtained from a processing having the smallest number of the second captured image signals.

12. The imaging method of claim 10, wherein in the image processing step, the respective non-saturation areas of the plurality of the captured image data obtained from the plural types of processing first from those obtained from processing having the largest number of the second captured image signals to be used is selected, and the captured image data is generated by combining the selected non-saturation areas.

13. The imaging method of claim 12, wherein in the image processing step, when the number of the selected non-saturation areas is insufficient, a shortage is supplemented with the saturation area of the captured image data obtained from a processing having the smallest number of the second captured image signals to be used.

14. The imaging method of claim 10, wherein in the image processing step, a processing in which the captured image data having the dynamic range instructed through the manipulation unit among the plural types of the processing is obtained is performed, and the captured image data obtained from the processing is allowed to be recorded on the recording medium.

15. The imaging method of claim 10, wherein in the image processing step, the respective plural types of the processing are performed and all of the captured image data obtained from the processing or a captured image data selected among them is allowed to be recorded on the recording medium.

16. The imaging method of claim 10, wherein the solid state imaging device is a MOS type solid state imaging device, the driving unit performs the global reset driving in which the accumulated electrical charges of the plurality of the first photoelectric conversion elements are simultaneously reset to make the first exposure period start, closes the mechanical shutter installed in light incident side of the solid state imaging device to make the first exposure period end after starting the first exposure period, and performs a rolling reset driving in which the accumulated electrical charges of the plurality of the second photoelectric conversion elements are reset for each line of the second photoelectric conversion elements while varying timing to make exposure periods except for at least the last exposure period of the plurality of second exposure periods start.

17. The imaging method of claim 16, wherein in the driving step, the global reset driving in which the accumulated electrical charges of the plurality of the second photoelectric conversion elements are simultaneously reset is performed to make the last exposure period of the plurality of second exposure periods start, and closes the mechanical shutter to make the last exposure period of the plurality of second exposure periods end.

18. The imaging apparatus of claim 10, wherein in the driving step, the first captured image signal is read using a first read-out circuit and the second captured image signal is read using a second read-out circuit installed separately from the first read-out circuit.

* * * * *